United States Patent
Driscoll

(10) Patent No.: US 7,428,810 B2
(45) Date of Patent: Sep. 30, 2008

(54) SYSTEM FOR INCREASING EFFICIENCY OF AN SCR CATALYST

(75) Inventor: James Joshua Driscoll, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/410,258

(22) Filed: Apr. 25, 2006

(65) Prior Publication Data

US 2007/0245719 A1 Oct. 25, 2007

(51) Int. Cl.
*F01N 3/00* (2006.01)
(52) U.S. Cl. .............................. 60/286; 60/274; 60/301; 60/303
(58) Field of Classification Search ................. 60/274, 60/286, 299, 301, 303
See application file for complete search history.

(56) References Cited

U.S. PATENT DOCUMENTS

| | | | |
|---|---|---|---|
| 4,958,598 A * | 9/1990 | Fosseen | 123/1 A |
| 5,071,802 A | 12/1991 | Shimizu et al. | |
| 5,534,237 A * | 7/1996 | Yoshida et al. | 423/239.1 |
| 5,611,198 A | 3/1997 | Lane et al. | |
| 5,809,774 A | 9/1998 | Peter-Hoblyn et al. | |
| 5,829,250 A | 11/1998 | Lane et al. | |
| 6,936,232 B2 * | 8/2005 | Gillespie et al. | 423/239.2 |
| 7,090,811 B2 * | 8/2006 | Cho et al. | 423/239.2 |
| 2004/0261403 A1 | 12/2004 | Asmus et al. | |

FOREIGN PATENT DOCUMENTS

| | | |
|---|---|---|
| EP | 0 679 427 A1 | 11/1995 |
| JP | 55146226 | 11/1980 |
| JP | 60-108518 | 6/1985 |
| WO | WO 95/04211 | 2/1995 |

OTHER PUBLICATIONS

Michael D. Kass et al., "Selective Catalytic Reduction of Diesel Engine NOx Emissions Using Ethanol as a Reductant," U.S. Department of Energy 9th Diesel Emissions Reduction Conference (Aug. 24-28, 2003) (8 pages).
PCT International Search Report, PCT/US2007/006083; International Filing Date: Mar. 9, 2007; Priority Date: Apr. 25, 2006; Applicant: Caterpillar Inc., Applicant's File Ref.: 05-888.

* cited by examiner

*Primary Examiner*—Thomas Denion
*Assistant Examiner*—Diem Tran
(74) *Attorney, Agent, or Firm*—Finnegan, Henderson, Farabow, Garrett & Dunner

(57) ABSTRACT

A power source has at least one combustion chamber, an exhaust system fluidly connected to the at least one combustion chamber and configured to receive an exhaust-gas stream, and a fuel source configured to supply fuel to the at least one combustion chamber. The power source also has an additive supply device configured to supply an ethanol additive to the at least one combustion chamber; and a selective reduction catalyst system catalyst fluidly connected to the exhaust system and configured to receive the exhaust-gas stream.

21 Claims, 3 Drawing Sheets

SYSTEM FOR INCREASING EFFICIENCY OF AN SCR CATALYST

TECHNICAL FIELD

This disclosure pertains generally to catalytic reduction of NOx emissions and, more particularly, to intake port injection of ethanol to improve efficiency of a selective catalytic reduction system catalyst.

BACKGROUND

Government standards associated with combustion engine emissions have increased the burden on manufacturers to reduce the amount of nitrogen oxides (NOx) and particulates that may be exhausted from their developed engines. Along with this burden is the manufacturer's commitment to their customers to produce fuel efficient engines. However, the sometimes inverse relationship between fuel economy and reduced emissions tends to make the task of reducing NOx while meeting customer needs a daunting one.

NOx emission levels may be affected by engine combustion temperatures and air to fuel-vapor ratio, among other things. When the temperature inside combustion chambers exceeds 1300 degrees C., nitrogen may combine with oxygen to form oxides of nitrogen, or NOx. Because lean mixtures in a power source typically lead to higher combustion temperatures, lean burn engines may produce more NOx than other richer burning power sources. Some engines rely on methods such as exhaust gas recirculation, for example, to lower combustion chamber temperatures and reduce NOx formation. These methods may be insufficient to meet standards promulgated by government agencies limiting NOx emissions.

Selective catalytic reduction (SCR) provides a method for removing NOx emissions from fossil fuel powered systems for engines, factories, and power plants. During typical SCR, a catalyst may facilitate a reaction between exhaust gas NOx and a reductant, for example, ethanol, to produce nitrogen gas and byproduct substances such as water, nitrogen, and acetaldehyde, thereby removing NOx from the exhaust gas.

Reductants used in an SCR system have previously been injected into the exhaust-gas stream upstream of a catalyst and mixed with the exhaust gas to facilitate a reaction in the presence of the catalyst. Thorough mixing of the reductant in the exhaust-gas stream may improve the reaction between the reductant and NOx, thereby further reducing NOx emissions and limiting the release of highly-reactive species into the atmosphere. The performance of a lean-NOx catalyst to reduce NOx may depend upon many other factors, such as catalyst formulation, the size of the catalyst, exhaust gas temperature, the reductant compound, and reductant dosing rate. The result has been to somewhat reduce atmospheric output of NOx, but reduction has fallen short of governmental requirements.

Anhydrous fuel-grade ethanol has been used with some success as a reductant in SCR systems through injection into an exhaust-gas stream upstream of an SCR system catalyst. In such a system, NOx in the exhaust-gas stream may react with the injected ethanol in the presence of the catalyst which may result in formation of acetaldehyde, nitrogen, water, and other byproducts. However, anhydrous fuel-grade ethanol is known to be highly reactive and difficult to store and maintain in its pure state. Further, injection of the ethanol into the exhaust stream is a waste of energy otherwise available within the ethanol.

Fuel-grade ethanol has also been emulsified within diesel fuel for combustion in quantities up to approximately 15% ethanol by volume as a means for increasing consumption of renewable type fuels and reducing some pollutant emissions. This emulsification has been accomplished using proprietary emulsifying agents to maintain some stability in the emulsion and reduce reactivity. However, emulsified ethanol is still highly corrosive and lacks the lubricating qualities of petroleum based fuels. This may result in long-term damage to injection pumps and fuel injectors designed to receive petroleum based fuels exclusively. Further, emulsions of ethanol within petroleum fuels greater than 15% ethanol by volume, create unstable, reactive emulsions and are, therefore, impractical for storage or use in an engine. Further, because the anhydrous fuel-grade ethanol is emulsified in low concentrations and designed for combustion, a majority of the emulsified ethanol is combusted in the combustion chamber, resulting in little if any remaining ethanol to be used as a reductant in the exhaust-gas stream.

One system for using fuel-grade anhydrous ethanol as a reductant in a lean-NOx SCR system is disclosed in the publication *Selective Catalytic Reduction of Diesel Engine NOx Emissions Using Ethanol as a Reductant*, U.S. Department of Energy $9^{th}$ Diesel Emissions Reduction Conference (Aug. 24-28, 2003) by Kass et al. (hereinafter "the Kass publication"). The system of the Kass publication includes an injector for spraying ethanol, which is either extracted from e-diesel or stored separately in a fuel-grade anhydrous form, directly into a bent region of the exhaust pipe to facilitate mixing of the ethanol and exhaust-gas stream. The system further includes a system for extracting a portion of fuel-grade ethanol from e-diesel which may be stored in a fuel storage tank. An ethanol injector is placed upstream of an alumina-supported silver lean-NOx catalyst such that conversion of NOx is facilitated as the mixture contacts the lean-NOx catalyst.

While the system of the Kass publication may result in some NOx reduction through ethanol introduced in the exhaust stream, both e-diesel and fuel-grade ethanol can be more difficult to store and manage because of their reactive characteristics. As a result, added cost may be incurred when using e-diesel and/or fuel-grade ethanol as a reductant injected into an exhaust stream.

In addition, injection of ethanol into an exhaust stream, as taught in the Kass publication, may not result in adequate mixing of the ethanol with the exhaust-gas stream, and, consequently, may result in discharge of unreacted fuel-grade ethanol. Moreover, injection of ethanol into the exhaust stream may deprive the engine of valuable energy stored within the ethanol, thereby eliminating any benefit to brake specific fuel consumption.

The present disclosure is directed at overcoming one or more of the problems or disadvantages in the prior art exhaust gas mixing systems.

SUMMARY OF THE INVENTION

According to one embodiment of the disclosure, a power source is disclosed. The power source may include at least one combustion chamber, an exhaust system fluidly connected to the at least one combustion chamber and configured to receive an exhaust-gas stream, and a fuel source configured to supply fuel to the at least one combustion chamber. The power source may further include an additive supply device configured to supply an ethanol additive to the at least one combustion chamber, and a selective reduction catalyst system catalyst fluidly connected to the exhaust system and configured to receive the exhaust-gas stream.

According to another embodiment of the disclosure, a method for increasing the efficiency of a selective catalytic reduction system catalyst is disclosed. The method may include the steps of providing an ethanol additive to a combustion chamber of the power source, supplying a primary fuel to the combustion chamber, combusting at least a portion of the primary fuel and at least a portion of the ethanol additive in the combustion chamber, wherein the combustion results in formation of an exhaust-gas stream, and exposing the exhaust-gas stream to a selective catalytic reduction system catalyst.

According to yet another embodiment of the disclosure, a machine is disclosed. The machine may include a frame, a traction device, and a power source operatively connected to the frame and the traction device. The power source may include at least one combustion chamber, an exhaust system fluidly connected to the at least one combustion chamber and configured to receive an exhaust-gas stream, and a fuel source configured to supply fuel to the at least one combustion chamber. The power source may further include an additive supply device configured to supply an ethanol additive to the at least one combustion chamber and a selective reduction catalyst system catalyst fluidly connected to the exhaust system and configured to receive the exhaust-gas stream.

DETAILED DESCRIPTION

Figure 1:
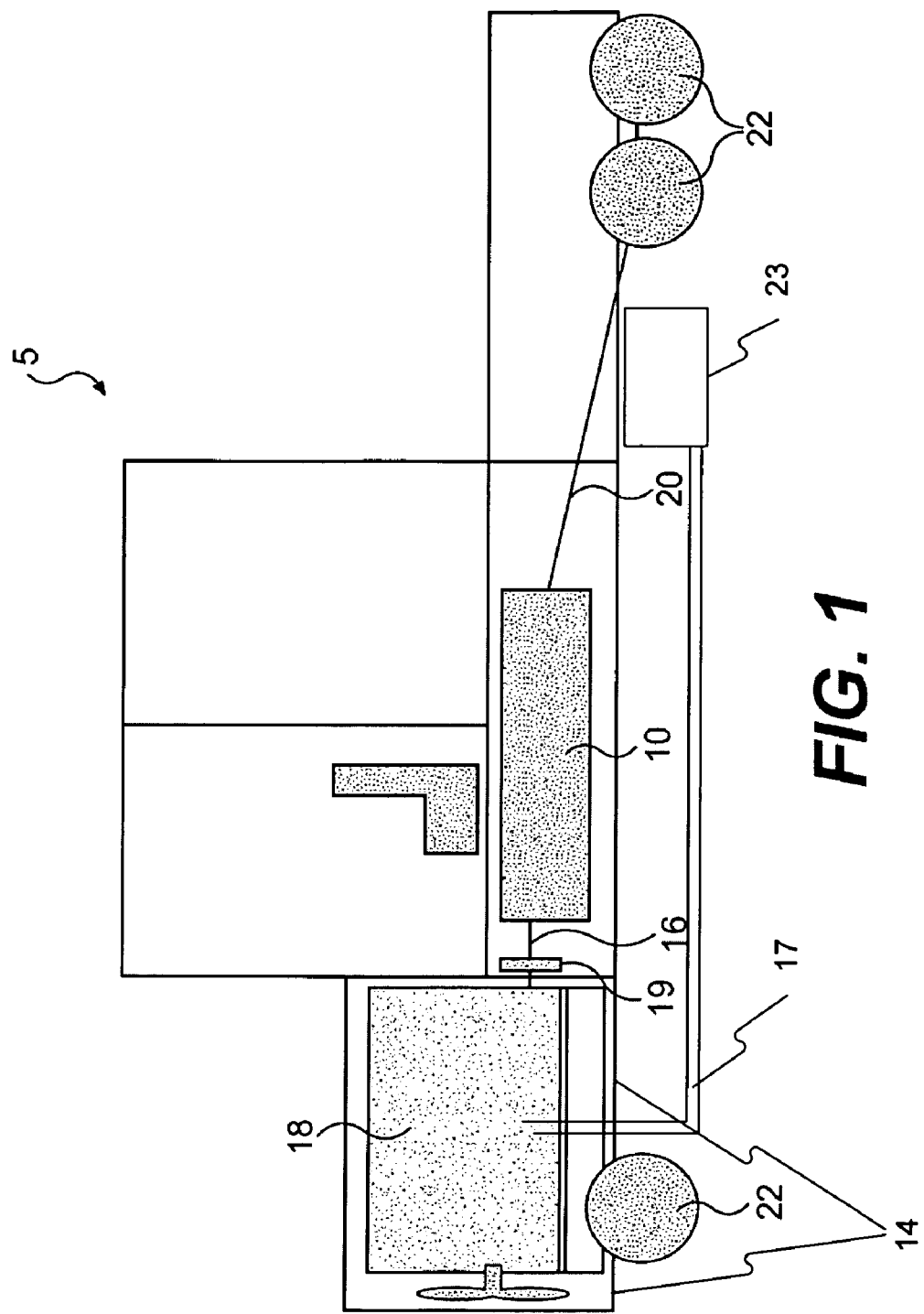
FIG. 1 provides a pictorial representation of a machine according to an exemplary disclosed embodiment.

FIG. 1 provides a pictorial representation of an exemplary machine 5 having multiple systems and components that may cooperate to accomplish a task. Machine 5 may include a system for increasing the efficiency of an SCR system catalyst. Machine 5 may embody a fixed or mobile machine that performs some type of operation associated with an industry such as mining, construction, farming, transportation, or any other industry known in the art. For example, machine 5 may be an earth moving machine such as an excavator, a dozer, a loader, a backhoe, a motor grader, a dump truck, or any other earth moving machine. Machine 5 may include a power source 18 and an input member 16 connecting a transmission assembly 10 to power source 18 via a torque converter 19. Machine 5 may also include a frame 14 and an output member 20 connecting the transmission assembly 10 to one or more traction devices 22 operatively connected to frame 14. Power source 18 may be operatively connected to frame 14 and may further be fluidly connected to an exhaust system 17, which may in turn be fluidly connected to an SCR system catalyst 23.

Figure 2:
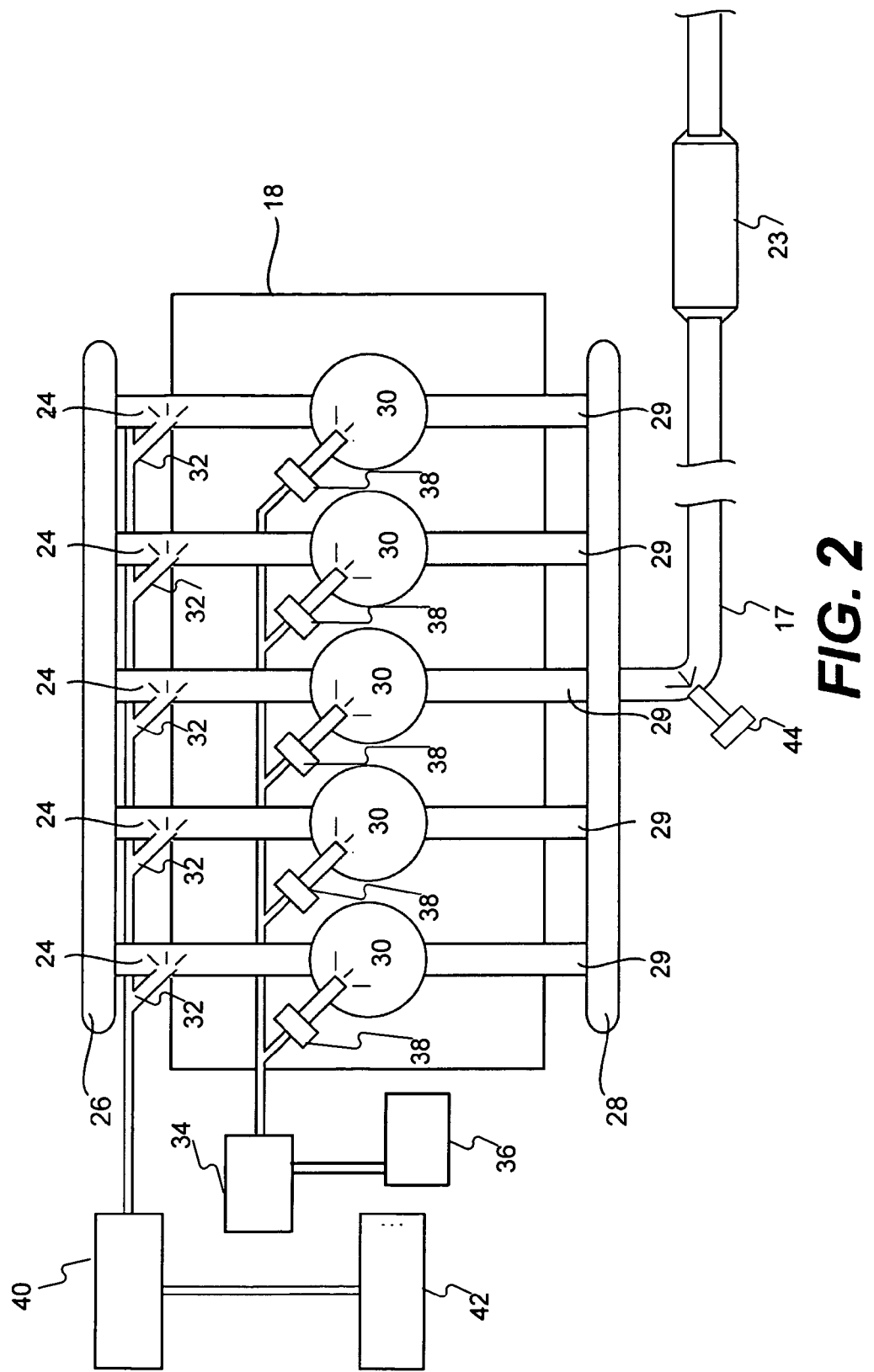
FIG. 2 schematically illustrates a power source, according to an exemplary disclosed embodiment.

FIG. 2 schematically illustrates a power source capable of implementing the disclosed systems and methods for increasing the efficiency of an SCR system catalyst. In an exemplary NOx emission reduction system, power source 18 includes an internal combustion engine, e.g., a diesel engine, a gasoline engine, a gaseous fuel-powered engine, and the like, or any other lean-burn engine apparent to one skilled in the art. Alternatively, power source 18 may be another source of power, such as a furnace, or another suitable source of power for a powered system (e.g., a factory or power plant) designed to operate with an excess of oxygen. Power source 18 may include, for example, an intake manifold 26, intake passages 24, exhaust ports 29, an exhaust manifold 28, combustion chambers 30, additive supply devices 32, and fuel sources 38. Power source 18 may further include a fuel pump 34, fuel storage 36, additive pump 40, and additive storage 42, among other things.

Combustion chambers 30 may be configured to receive and combust materials including fuel and air. Additionally, each combustion chamber 30 may be configured to receive at least one additive material including, for example an ethanol additive and/or a hydrous ethanol additive. Hydrous ethanol will be understood to mean any combination of ethanol and water in any proportion appropriate for addition to a combustion chamber. The term ethanol additive, as referred to throughout this specification, will be understood to mean any substance or mixture containing ethanol in amounts greater than 15 percent by volume, including fuel-grade ethanol, denatured ethanol, and hydrous ethanol. For example, an ethanol additive may include between 30 percent ethanol by volume and 80 percent ethanol by volume. In one embodiment, the ethanol additive is a hydrous ethanol and includes approximately 40 percent ethanol by volume and 60 percent water by volume. A hydrous ethanol additive may be similar to vodka or other distilled spirits, or the hydrous ethanol additive may be denatured. Hydrous denatured ethanol may be less expensive than pure ethanol and may be substantially more stable for easier storage and transport. One of ordinary skill in the art will recognize that the ethanol additive compositions described herein are exemplary only, and numerous variations of ethanol additives may be used without departing from the scope of the disclosed systems and methods.

Combustion chambers 30 may be configured for compression ignition (CI), spark ignition (SI), homogeneous charge compression ignition (HCCI), or any other type of combustion ignition. For example, a diesel engine may initiate combustion as a piston (not shown) within combustion chamber 30 nears top-dead-center and critical temperature and pressure are reached.

Combustion chambers 30 may be configured to receive a supply of fuel from fuel sources 38. Fuel sources 38 may include injectors or atomizers configured to inject fuel directly into combustion chambers 30. Alternatively, fuel sources 38 may be configured to supply fuel to intake manifold 26 or intake passages 24. Fuel sources 38 may be configured to supply fuel at a specific time (timed injection) or, alternatively, may be configured to introduce fuel continuously or at random intervals. Configuration of fuel sources 38 may depend upon the combustion configuration of combustion chambers 30 (e.g., CI, SI, or HCCI).

Fuel sources 38 may be operatively connected to fuel pump 34. Fuel pump 34 may be configured to deliver fuel from fuel storage 36 to fuel sources 38. Fuel pump 34 may include an injection pump of the rotary or distributor variety, or any other suitable pump, and may be driven indirectly by gears or chains from the crankshaft or by other methods (e.g., electrically). One of skill in the art will recognize that many types of pumps may function adequately and fall within the scope of the current disclosure.

The fuel supplied to combustion chambers 30 may include, for example, diesel fuel, gasoline, alcohols, propane, methane, or any other suitable fuel. The fuel may be supplied to fuel sources 38 under pressure, and/or fuel sources 38 may, themselves, be configured to further increase the pressure or velocity of the fuel. Fuel storage 36 may be configured to store fuel, among other things, and may include a tank or other similar container. Fuel may be supplied at timed intervals (e.g., based on power source 18 rotational position), randomly, and/or continuously. Control of the fuel source 38 may be regulated by methods known by those of ordinary skill in the art and appropriate for the type of power source in operation.

Intake manifold 26 may be configured to draw air from atmosphere or from an air source (e.g., a turbocharger) and provide the air to combustion chambers 30 via intake passages 24. For example, intake manifold 26 may be fluidly connected to a forced induction system such as the outlet of a turbocharger or supercharger. Intake manifold 26 may further be fluidly connected to at least one intake passage 24 which in turn may be fluidly connected to a combustion chamber 30. In one embodiment consistent with the disclosure, intake manifold 26 may also be fluidly connected to an additive supply device 32 configured to supply an ethanol additive to intake manifold 26. It is important to note that while additive supply devices 32 are depicted in FIG. 2 as being fluidly connected to intake passages 24, additive supply devices 32 may be located at any suitable location for providing the ethanol additive to combustion chambers 30. For example, additive supply devices 32 may also be located at intake manifold 26, combustion chambers 30, a turbocharger outlet (not shown), or any other suitable location such that an ethanol additive may by provided to combustion chambers 30. Additive supply devices 32 may include an injector or atomizer similar to that depicted by additive supply device 32 and may be installed in intake manifold 26 to cause an ethanol additive to be introduced and mixed with other substances contained therein. Fuel or other additive substances (e.g., performance boosting substances including propane) may also be supplied to intake manifold 26.

Intake passages 24 may be configured to carry substances including, air, fuel, an ethanol additive, other substances, or any combination thereof, to combustion chamber 30. Intake passages 24 may contain additive supply devices 32 configured to supply an ethanol additive to combustion chambers 30. Intake passages 24 may further include devices to facilitate mixing of materials entering combustion chambers 30. Such devices may be configured to impart rotation to the flow of materials within intake passages 24. Intake passages 24 may be opened to combustion chambers 30 via intake valve assemblies (not shown) which may open and close as desired to facilitate flow of materials (e.g., air and/or ethanol additive) into combustion chamber 30.

Additive supply devices 32 may be connected to additive pump 40 or other apparatus designed to pressurize or impart motion to fluid or gas. Additive pump 40 may be an injection pump of the rotary or distributor variety, among others, and may be driven indirectly by gears or chains from the crankshaft or by other methods (e.g., electrically). One of skill in the art will recognize that many types of pumps may function adequately and fall within the scope of the current disclosure. Additive pump 40 may be configured to draw an ethanol additive from additive storage 42 and supply the ethanol additive to additive supply devices 32. The ethanol additive may be supplied to additive supply devices 32 under pressure, or alternatively, additive supply devices 32 may be configured to increase the pressure or velocity of the ethanol additive. Supply of an ethanol additive may occur at timed intervals, continuously, or randomly. Additive storage 42 may be configured to store an ethanol additive, among other things, and may include a tank or other similar container.

Further, control of the ethanol additive supply may be regulated based on sensors present in exhaust system 17, engine timing, and other suitable factors. For example, where a sensor present in the exhaust-gas stream indicates the presence of unacceptable levels of unburned ethanol, the ethanol additive supply rate may be modified accordingly. One of ordinary skill in the art will recognize that other methods for providing and controlling the flow of ethanol additive to combustion chamber 30 may be available and fall within the scope of this disclosure.

Combustion within combustion chambers 30 may result in at least a portion of the fuel and at least a portion of the ethanol present in the ethanol additive to be combusted. Heat and/or power may be derived from the combustion of both the fuel and the ethanol. For example, ethanol from the ethanol additive may be combusted in amounts up to 95 percent and may produce up to 50 percent of available brake horsepower. Further, water from the hydrous ethanol additive may assist in reducing flame temperature in combustion chamber 30, and may therefore assist in reducing NOx produced during the combustion. One of skill in the art will recognize that such effects may vary based on ethanol and water concentrations in the ethanol additive.

As a result of combustion, an exhaust-gas stream including NOx, unburned ethanol, water, and hydrocarbons (e.g., unburned fuel), among other things, may be generated. The unburned ethanol may include gas phase ethanol and may be substantially mixed with the exhaust-gas stream via the combustion process within combustion chamber 30. Gas-phase ethanol may be present in the exhaust-gas stream in amounts between about 5 percent by volume and about 15 percent by volume of the exhaust-gas stream. One of ordinary skill in the art will recognize that higher or lower concentrations of ethanol may be present in the exhaust-gas stream based on numerous conditions (e.g., temperature, water content, ethanol additive input, etc.).

Exhaust ports 29 may be fluidly connected to combustion chambers 30 and configured to receive the exhaust-gas stream generated as a result of combustion of the fuel and at least a portion of an ethanol additive within combustion chambers 30. The fluid connection from combustion chambers 30 to exhaust ports 29 may be opened and closed using exhaust valve assemblies (not shown) to allow flow of an exhaust-gas stream from combustion chambers 30 into exhaust ports 29. The exhaust valve assemblies may also be configured to allow such flow to occur at timed intervals. Further, exhaust ports 29 may be fluidly connected to a secondary additive supply device 44 configured to provide additional ethanol additive to the exhaust-gas stream. It is important to note that although secondary additive supply device 44 is depicted in FIG. 2 as being fluidly connected to exhaust system 17, secondary additive supply device 44 may be located at any suitable location for providing the ethanol additive to the exhaust-gas stream. For example, secondary additive supply device 44 may also be located at exhaust manifold 28, exhaust ports 29, exhaust system 17, or any other suitable location for providing an ethanol additive to the exhaust gas stream. Additive pump 40 may also be configured to draw an ethanol additive from additive storage 42 and supply the ethanol additive to secondary additive supply device 44.

Exhaust manifold 28 may be fluidly linked to at least one exhaust port 29 and may collect and receive an exhaust-gas stream from the at least one exhaust port 29. Exhaust manifold may operate to link several exhaust ports 29 together and receive the cumulative exhaust from exhaust ports 29. Exhaust manifold 28 may further include devices for supplying other substances (e.g., urea, ethanol, etc.) for mixture in the exhaust-gas stream, or, alternatively, no such additional devices may be present. For example, exhaust manifold 28 may be fluidly connected to secondary additive supply device 44, which may be configured to supply ethanol additive to exhaust manifold 28. Exhaust manifold 28 may include sensors (not shown) for detecting levels of exhaust gas pollutants as well as levels of remaining ethanol and/or other substances within the exhaust-gas stream. Where the sensors indicate low levels of unburned ethanol, additional ethanol additive may be provided to exhaust manifold 28, or other suitable location, by secondary additive supply device 44. Exhaust manifold 28 may further include fluid connections to allow for recirculation of some exhaust gas and/or coupling of exhaust gas to the turbine of a turbocharger (not shown).

Exhaust manifold 28 may be fluidly connected to an exhaust system 17, which may be configured to receive the exhaust-gas stream from exhaust manifold 28. Exhaust system 17 may include pipes, tubes, clamps, etc., and may direct the flow of the exhaust-gas stream in various directions. Exhaust system 17 may also be fluidly connected to secondary additive supply device 44 and configured to receive additional ethanol additive for combination with the exhaust-gas stream. Exhaust system 17 may also include sensors, mixing devices, and fluid connections to recirculation devices and turbocharger turbines (not shown), among other things.

SCR system catalyst 23 may be disposed in exhaust system 17 downstream of exhaust manifold 28. Exhaust system 17 may direct flow of the exhaust-gas stream such that the exhaust-gas stream is received by SCR system catalyst 23 and caused to contact the SCR system catalyst.

SCR system catalyst 23 may be made from a variety of materials. SCR system catalyst 23 may include a catalyst support material and a metal promoter dispersed within the catalyst support material. The catalyst support material may include at least one of alumina, zeolite, aluminophosphates, hexaluminates, aluminosilicates, zirconates, titanosilicates, and titanates. In one embodiment, the catalyst support material may include at least one of alumina and zeolite, and the metal promoter may include silver metal (Ag). Combinations of these materials may be used, and the catalyst material may be chosen based on the type of fuel used, the ethanol additive used, the air to fuel-vapor ratio desired, and/or for conformity with environmental standards. One of ordinary skill in the art will recognize that numerous other catalyst compositions may be used without departing from the scope of this disclosure. Further, multiple SCR system catalysts may also be included in exhaust system 17.

The lean-NOx catalytic reaction is a complex process including many steps. One of the reaction mechanisms, however, that may proceed in the presence of SCR system catalyst 23 can be summarized by the following reaction equations:

$$NO+O_2 \rightarrow NOx \quad (1)$$

$$HC+O_2 \rightarrow \text{oxygenated HC} \quad (2)$$

$$NOx+\text{oxygenated HC}+O_2 \rightarrow N_2+CO_2+H_2O \quad (3)$$

SCR system catalyst 23 may catalyze the reduction of NOx to $N_2$ gas, as shown in equation (3). Further, as shown in equation (2), a hydrocarbon reducing agent may be converted to an activated, oxygenated hydrocarbon that may interact with the NOx compounds to form organo-nitrogen containing compounds. These materials may possibly decompose to isocyanate (NCO) or cyanide groups and eventually yield nitrogen gas ($N_2$) through the series of reactions as summarized above. As noted, the unburned ethanol may be well mixed within the exhaust-gas stream as a result of the combustion process in combustion chamber 30. This well-mixed, unburned ethanol, and any additional ethanol additive, may further react in the presence of other hydrocarbons (e.g., unburned fuel) in order to aid in the production of oxygenated hydrocarbons, as represented by equation (2).

INDUSTRIAL APPLICABILITY

The disclosed systems and methods may be applicable to any powered system that includes a power source that produces an exhaust-gas stream, such as an engine. The disclosed systems and methods may allow for reduction efficiencies of NOx from an exhaust-gas stream of greater than 90 percent, which may meet EPA regulations effective in the year 2010. Operation of the disclosed systems and methods will now be explained.

Operation of combustion chambers 30 may be dependant on the ratio of air to fuel-vapor that is supplied during operation. When determining the air to fuel-vapor ratio, primary fuel as well as other combustible materials in combustion chamber 30 (e.g., ethanol additive, propane, etc.) may be included as fuel-vapor. The air to fuel-vapor ratio is often expressed as a lambda value, which is derived from the stoichiometric air to fuel-vapor ratio. The stoichiometric air to fuel-vapor ratio is the chemically correct ratio for combustion to take place. A stoichiometric air to fuel-vapor ratio may be considered to be equivalent to a lambda value of 1.0.

Combustion chambers may operate at non-stoichiometric air to fuel-vapor ratios. A combustion chamber with a lower air to fuel-vapor ratio has a lambda less than 1.0 and is said to be rich. A combustion chamber with a higher air to fuel-vapor ratio has a lambda greater than 1.0 and is said to be lean.

Lambda may affect combustion chamber NOx emissions and fuel efficiency. A lean-operating combustion chamber may have improved fuel efficiency compared to a combustion chamber operating under stoichiometric or rich conditions. However, lean operation may increase temperature and, therefore, increase NOx production, making elimination of NOx in the exhaust gas difficult.

SCR systems can provide a method for decreasing exhaust-gas NOx emissions through the use of additives such as ethanol. In an exemplary embodiment of the present disclosure, NOx and unburned ethanol generated by lean combustion (lambda greater than 1.0) in combustion chambers 30 may be converted into acetaldehyde, nitrogen, water, and other substances in the presence of an SCR system catalyst 23.

Figure 3:
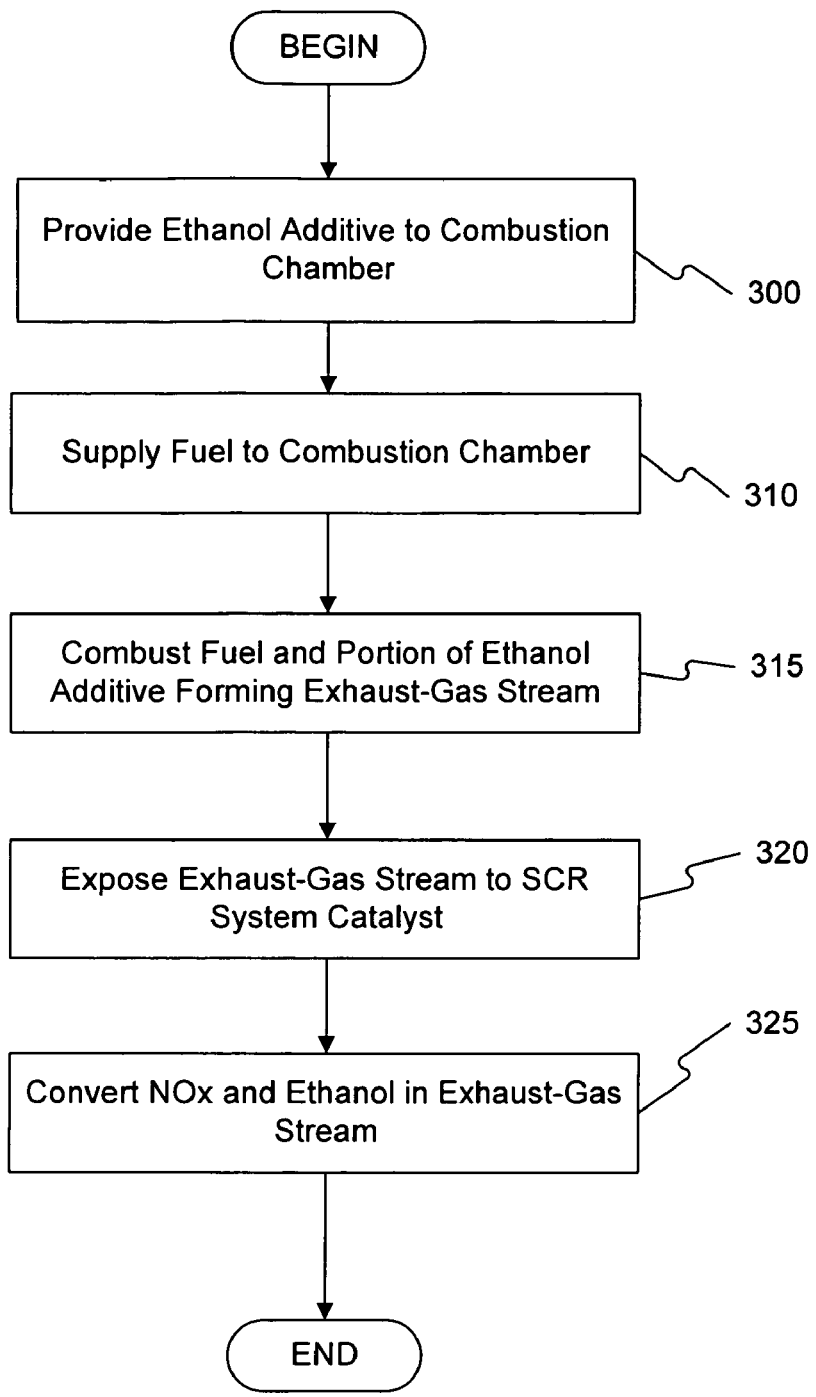
FIG. 3 is a flow chart illustrating an exemplary disclosed method of increasing efficiency of an SCR system catalyst using intake-port injected hydrous ethanol.

FIG. 3 is a flowchart depicting one exemplary method for operation of the disclosed systems and methods. In one embodiment, additive supply devices 32 may provide an ethanol additive to combustion chambers 30 (step 300). Once the ethanol additive has been supplied to combustion chambers 30, along with a suitable amount of air, fuel may be supplied to combustion chambers 30 (step 310). Following the supply of fuel, combustion of the materials within combustion chambers 30 may be initiated (step 315). A fluid connection between exhaust manifold 28 and exhaust system 17 may then allow an exhaust-gas stream formed as a result of combustion, to be received by exhaust system 17. Exhaust system 17 may be configured to direct the exhaust-gas stream to be received by SCR system catalyst 23 via a fluid connection (step 320). The exhaust-gas stream may then flow through SCR system catalyst 23, thus contacting SCR system catalyst 23 based on the design and flow pattern of SCR system catalyst 23. SCR system catalyst 23 may facilitate reactions resulting in the reduction/conversion of NOx from the exhaust-gas stream (step 325). The products of such conversion may include nitrogen, water, and acetaldehyde, among other things. The resulting reduction efficiencies of SCR system catalyst 23 for NOx may, therefore, be increased to greater than 90 percent. In other words, NOx within an exhaust-gas stream may be reduced by greater than 90 percent and may meet federal regulations for year 2010 NOx emissions.

Several advantages may be associated with the disclosed systems and method for increasing efficiency of an SCR system catalyst. For example, ethanol additives containing water (i.e., hydrous ethanol), whether denatured or not, may be substantially less reactive than pure fuel-grade ethanol. Further, pure fuel-grade ethanol may act as a desiccant drawing in water from the surrounding atmosphere, whereas hydrous ethanol additives may be stored at equilibrium. Therefore, requirements for storage and transportation of a hydrous ethanol additive may be substantially lower than for storage and transportation of pure fuel-grade ethanol. Use of hydrous ethanol additives may lead to significant cost savings over pure fuel-grade ethanol.

Moreover, by providing a system for supplying an ethanol additive, pre-combustion, to an intake port, intake manifold, or combustion chamber, and distinct from the fuel supply system, equipment specifically designed to handle ethanol may be used. Ethanol may be corrosive to rubber and some metal parts and can damage parts designed for use with petroleum based products, for example, pumps, injectors, etc. By using parts designed specifically designed for ethanol (e.g., plastics), this damage can be reduced or eliminated.

Additionally, injection of an ethanol additive into an intake port prior to combustion may allow for greater mixing of any remaining ethanol within an exhaust-gas stream. Increased mixing may occur as the result of many mechanisms related to the combustion process (e.g., turbulence, compression, etc.). Complete mixing of ethanol within the exhaust-gas stream may be beneficial to increasing the reduction efficiency of an SCR system catalyst. Therefore, combining an SCR system catalyst with intake port injection of ethanol may result in substantial increased efficiency of the reaction between NOx and ethanol contained in the exhaust-gas stream as the stream contacts the SCR system catalyst. Moreover, allowing a portion of the ethanol to be combusted in combustion chambers 30 may further result in benefits to brake specific fuel consumption while also leaving an amount of unburned ethanol in the exhaust-gas stream. The amount of ethanol remaining in the exhaust-gas stream may be sufficient to facilitate catalytic reduction reactions and may improve the efficiency of an SCR system catalyst. But, the amount of unburned ethanol in the exhaust-gas stream may remain small enough to substantially prevent emission of reactive ethanol species into the air post catalyst.

It will be apparent to those skilled in the art that various modifications and variations can be made to the disclosed system and methods for increasing efficiency of an SCR catalyst. Other embodiments will be apparent to those skilled in the art from consideration of the specification and practice of the disclosed systems and methods for increasing efficiency of an SCR catalyst. It is intended that the specification and examples be considered as exemplary only, with a true scope being indicated by the following claims and their equivalents.

What is claimed is:

1. A power source, comprising:
   at least one combustion chamber;
   an exhaust system fluidly connected to the at least one combustion chamber and configured to receive an exhaust-gas stream;
   a fuel source configured to supply fuel to the at least one combustion chamber;
   an additive supply device configured to supply a quantity of an ethanol additive to the at least one combustion chamber;
   a sensor configured to provide a signal based on a concentration associated with an uncombusted ethanol additive in the exhaust-gas stream;
   a selective reduction catalyst system catalyst fluidly connected to the exhaust system and configured to reduce a NOx level associated with the exhaust-gas stream in the presence of the uncombusted ethanol additive; and
   a controller configured to modify the quantity of the ethanol additive based on the signal such that the reduction of the NOx level in the presence of the selective reduction catalyst system catalyst is greater than 90 percent by weight.

2. The power source of claim 1, wherein the additive supply device is configured to inject the ethanol additive directly into the combustion chamber.

3. The power source of claim 1, wherein at least some of the ethanol additive is combusted in the combustion chamber with the primary fuel.

4. The power source of claim 1, further including an intake passage fluidly connected to an air supply and the at least one combustion chamber.

5. The power source of claim 4, wherein the additive supply device is configured to provide the ethanol additive to the at least one combustion chamber by injecting the ethanol additive into at least one of the intake passage and an intake manifold.

6. The power source of claim 5, further including a secondary additive supply device configured to provide the ethanol additive to the exhaust system.

7. The power source of claim 1, wherein the ethanol additive includes hydrous ethanol.

8. The power source of claim 7, wherein the hydrous ethanol includes water in an amount between about 30 percent by volume and about 80 percent by volume.

9. The power source of claim 1, wherein the selective reduction catalyst system catalyst includes a lean-NOx catalyst.

10. The power source of claim 9, wherein the lean-NOx catalyst includes alumina-supported silver.

11. A method for increasing the efficiency of a selective catalytic reduction system catalyst, the method comprising:
    providing an ethanol additive to a combustion chamber of the power source;
    supplying a primary fuel to the combustion chamber;
    combusting at least a portion of primary fuel and at least a portion of the ethanol additive in the combustion chamber, wherein the combustion results in formation of an exhaust-gas stream;
    determining a concentration of uncombusted ethanol in the exhaust-gas stream;
    exposing the exhaust-gas stream to a selective catalytic reduction system catalyst configured to reduce NOx in the presence of the uncombusted ethanol additive; and
    controlling the quantity of ethanol additive provided to the combustion chamber such that the NOx reduction is greater than 90 percent by weight in the presence of the selective catalytic reduction system catalyst.

12. The method of claim 11, wherein supplying the ethanol additive to the combustion chamber is accomplished by providing the ethanol additive to an intake passage fluidly connected to an air supply and the combustion chamber.

13. The method of claim 11, wherein the ethanol additive includes hydrous ethanol.

14. The method of claim 11, wherein at least some of the ethanol additive is combusted in the combustion chamber.

15. The method of claim 11, further including providing the ethanol additive to the exhaust-gas stream.

16. The method of claim 11, wherein supplying the ethanol additive to the combustion chamber includes injecting the ethanol additive directly into the combustion chamber.

17. The method of claim 16, wherein the hydrous ethanol includes water in an amount between about 30 percent by volume and about 80 percent by volume.

18. The method of claim 11, wherein the selective reduction catalyst system catalyst includes a lean-NOx catalyst.

19. The method of claim 18, wherein the lean-NOx catalyst includes alumina-supported silver.

20. A machine, comprising:
- a frame;
- a traction device; and
- a power source operatively connected to the frame and the traction device, wherein the power source includes:
  - at least one combustion chamber;
  - an exhaust system fluidly connected to the at least one combustion chamber and configured to receive an exhaust-gas stream;
  - a fuel source configured to supply fuel to the at least one combustion chamber;
  - an additive supply device configured to supply a quantity of an ethanol additive to the at least one combustion chamber;
  - a sensor configured to provide a signal based on a concentration associated with an uncombusted ethanol additive in the exhaust-gas stream;
  - a selective reduction catalyst system catalyst fluidly connected to the exhaust system and configured to reduce a NOx level associated with the exhaust-gas stream in the presence of the uncombusted ethanol additive; and
  - a controller configured to modify the quantity of the ethanol additive based on the signal such that the reduction of the NOx level in the presence of the selective reduction catalyst system catalyst is greater than 90 percent by weight.

21. The machine of claim 20, wherein the power source further includes:
- an intake passage fluidly connected to an air supply and the combustion chamber, and the additive supply device is configured to supply the ethanol additive to the combustion chamber by injecting the ethanol additive into the intake passage; and
- a device configured to provide the ethanol additive to the intake passage.

* * * * *